United States Patent
Curry et al.

(10) Patent No.: US 6,993,474 B2
(45) Date of Patent: Jan. 31, 2006

(54) INTERACTIVE CONVERSATIONAL SPEECH COMMUNICATOR METHOD AND SYSTEM

(76) Inventors: David G. Curry, 509 W. Broadway, Sedalia, MO (US) 65301; Jason R. Curry, 5116 Northern, Kansas City, MO (US) 64133

( * ) Notice: Subject to any disclaimer, the term of this patent is extended or adjusted under 35 U.S.C. 154(b) by 660 days.

(21) Appl. No.: 09/859,059

(22) Filed: May 17, 2001

(65) Prior Publication Data

US 2002/0173965 A1 Nov. 21, 2002

(51) Int. Cl.
*G06F 17/28* (2006.01)
*G09G 5/16* (2006.01)

(52) U.S. Cl. .......................................... 704/3; 345/171
(58) Field of Classification Search ................... 704/2, 704/3, 8, 270, 277; 345/733, 750, 761, 171
See application file for complete search history.

(56) References Cited

U.S. PATENT DOCUMENTS

| | | | |
|---|---|---|---|
| 4,599,612 A * | 7/1986 | Kaji et al. ................... 345/635 |
| 4,805,132 A * | 2/1989 | Okamoto et al. ............... 704/3 |
| 4,964,177 A * | 10/1990 | Huang ............................ 704/3 |
| 5,169,342 A | 12/1992 | Steele et al. |
| 5,175,684 A | 12/1992 | Chong |
| 5,268,839 A * | 12/1993 | Kaji ............................... 704/3 |
| 5,338,976 A | 8/1994 | Anwyl et al. |
| 5,351,189 A | 9/1994 | Doi et al. |
| 5,608,622 A | 3/1997 | Church |
| 5,612,872 A | 3/1997 | Fujita |
| 5,615,301 A | 3/1997 | Rivers |
| 5,712,901 A | 1/1998 | Meermans |
| 5,715,466 A * | 2/1998 | Flanagan et al. ............... 704/5 |
| 5,724,526 A | 3/1998 | Kunita |
| 5,781,902 A | 7/1998 | Waszkiewicz |
| 5,805,167 A | 9/1998 | van Cruyningen |
| 5,852,800 A | 12/1998 | Modeste et al. |
| 5,854,997 A | 12/1998 | Sukeda et al. |
| 5,875,422 A | 2/1999 | Eslambolchi et al. |
| 5,917,484 A | 6/1999 | Mullaney |
| 5,943,398 A | 8/1999 | Klein et al. |
| 5,974,372 A | 10/1999 | Barnes et al. |

(Continued)

OTHER PUBLICATIONS

Ballersteros et al., "Phrasal Translation and Query Expansion Techniques for Cross-Language Information Retrieval", pp. 84-91, 1997, Ctr. for Intelligent Info. Retrieval, C.S. Dept., UMASS Amherst.

(Continued)

*Primary Examiner*—Martin Lerner
(74) *Attorney, Agent, or Firm*—Nixon Peabody LLP; Jeffrey L. Costellia

(57) ABSTRACT

The invention relates to a compact and portable interactive system for allowing person-to-person communication in a typed language format between individuals experiencing language barriers such as the hearing impaired and language impaired. According to the present invention, the sComm system includes a custom laptop configuration having a display screen and one keyboard on each side of the laptop; and data translations means for translating the original typed data from a first language to a second language. The display screen will further have a split configuration, i.e., a double screen, either top/bottom or left/right depicting chat boxes, each chat box dedicated to a user. The sComm system will be able to support multilingual text-based conversations. In particular, a user will be able to translate, using existing translating technology, the typed text into other languages including, but not limited to, English, Spanish, Chinese, German and French. As such, one chat box can display a text in a first language and the other chat box can display the same text but in a second language.

6 Claims, 5 Drawing Sheets

U.S. PATENT DOCUMENTS

| | | | |
|---|---|---|---|
| 5,987,401 A | | 11/1999 | Trudeau |
| 6,061,646 A | * | 5/2000 | Martino et al. .................. 704/3 |
| 6,073,146 A | | 6/2000 | Chen |
| 6,119,078 A | | 9/2000 | Kobayakawa et al. |
| 6,122,606 A | | 9/2000 | Johnson |
| 6,161,082 A | * | 12/2000 | Goldberg et al. ............... 704/3 |
| 6,167,366 A | | 12/2000 | Johnson |
| 6,173,250 B1 | | 1/2001 | Jong |
| 6,205,418 B1 | | 3/2001 | Li et al. |
| 6,208,956 B1 | | 3/2001 | Motoyama |
| 6,240,392 B1 | | 5/2001 | Butnaru et al. |
| 6,307,549 B1 | * | 10/2001 | King et al. .................... 704/3 |
| 6,670,950 B1 | * | 12/2003 | Chin et al. ................... 345/173 |

OTHER PUBLICATIONS

Sheridan et al., "Experience in Multilingual Info Retrieval Using the SPIDER System", pp. 58-65, 1996, Swiss Federal Institute of Technology.

* cited by examiner

INTERACTIVE CONVERSATIONAL SPEECH COMMUNICATOR METHOD AND SYSTEM

BACKGROUND OF THE INVENTION

1. Field of the Invention

This invention relates generally to a portable interactive conversational speech communicator. In particular, an exemplary embodiment of this invention relates to a portable interactive conversational speech communicator with split screens and a keyboard on each side allowing at least two individuals to communicate without the use of a human translator.

2. Description of Related Art

Over 28 million people in the United States experience some degree of hearing loss. Approximately four million of those are profoundly deaf. Many of these hearing impaired individuals, in addition to individuals speaking a language different from that of their surroundings, are confronted with barriers which impede their ability to effectively communicate with others. Such barriers include the inability to use spoken language, the inability of others to use and understand sign language, and the inability to understand the language being spoken to them.

Conversations with the hearing impaired are becoming increasingly limited due to the lack of sign language skills of most individuals. Those individuals who do not have a broad range of sign language skills are faced with a limited amount of resources available in order to effectively communicate with the hearing impaired. For example, the use of hand written notes, the use of gestures and closed captioning devices are commonly used. Lip reading is also commonly used. However, all of these techniques are limiting for the hearing impaired because intricate, involved conversations are not possible without the aid of a human interpreter, or the time consuming and frustrating necessity of passing notes back and forth.

As for the case of not being able to communicate in a foreign language, many individuals resort to laboriously looking up words in a foreign language dictionary if one is available and if the other listener is willing to spend the time waiting. For both the hearing impaired and the individual incapable of speaking a foreign language, a human interpreter has been the best resource available. However, the use of a human interpreter is often difficult to arrange as well as expensive.

Individuals who can not speak or hear, or individuals who are not versed in the language at hand, experience difficulties in performing everyday tasks such as communicating with retail clerks, law enforcement officials, teachers, neighbors, communicating with co-workers, or the like. Both the personal family scenario and the professional scenario are hampered by the language barriers.

In addition, professionals traveling internationally constantly are confronted with business associates who speak different languages. In this instance, the use of language interpreters are an expensive necessity. However, the need to have private interactive conversations with foreign associates without a third party present, i.e. an interpreter, particularly conversations of a sensitive nature, is a growing concern. Even casual international travelers wish to have social conversations with those speaking a different language.

Medical professionals are bombarded everyday with patients who do not speak the language of the attending personnel. In this time sensitive and sometimes life threatening situation, there is not always enough time to find a human interpreter in order to diagnose the problem at hand.

Hence, there is a need to provide a portable interactive conversational speech communicator which allows two or more individuals to converse without regard to the individual's language capabilities or language origin.

SUMMARY OF THE INVENTION

The present invention has been developed with the view to substantially changing the way individuals communicate on a global scale by using an interactive Speech Communicator (sComm) system. The sComm system is a tool especially useful for people who are deaf, hard of hearing, or for those speaking a foreign language. The hearing or speaking impaired will be able to seamlessly converse with others without the need for a translator. Businessmen of different cultures and languages will be able to converse in conference rooms around the world without the necessity of having a human interpreter by using the sComm system.

The sComm system provides a system for breaking down barriers in communication for people with hearing loss or for those who speak foreign languages by allowing such individuals to comprehend typed language in an interactive two-way environment, without the need for a human translator.

Broadly speaking, the invention relates to a compact and portable interactive system for allowing person-to-person communication in a typed language format between individuals. According to an exemplary embodiment of the present invention, the sComm system comprises: a custom laptop configuration having a display screen and one keyboard on each side of the laptop; and data translations means for translating the original typed data from a first language to a second language. The exemplary display screen will further have a split configuration, i.e., a double screen, either top/bottom or left/right depicting chat boxes, each chat box dedicated to a user.

Further in accordance with an exemplary embodiment the present invention, users of the portable sComm system will be able to communicate directly with each other by utilizing the double screen/double keyboard configuration and typing written text. The typed text can be displayed, for example, in respective chat boxes in either the originally typed language or a selected translated language. The sComm system will be able to support multilingual text-based conversations. In particular, a user will be able to translate, using existing translating technology, the typed text into other languages including, but not limited to, English, Spanish, Chinese, German and French. As such, one chat box can display English text and the other chat box can display the same text but in Spanish.

Further in accordance with an exemplary embodiment the present invention, the keyboards used in the sComm system can be a standard keyboard or a custom keyboard. The custom keyboard can include special shortcut keys, sign language characters, or foreign language symbols.

Further in accordance with an exemplary embodiment the present invention, the double screen/double keyboard laptop configuration of the sComm will allow communicants to stand/sit across from each other to communicate rather than attempting to alternate use of one keyboard and screen.

Further in accordance with an exemplary embodiment the present invention, the split screen configuration of the sComm will allow each communicant to read what the other is saying simultaneously as it is being typed for rapid communication.

The invention can be implemented in numerous ways, including a system, a method, or as a computer readable medium.

As a portable system for supporting multilingual text-based conversations between two communicants, an exemplary embodiment of the invention includes: a conversation processor, residing in the portable sComm, for receiving and relaying the text-based messages on the split screens; and a translation control processor, residing in the portable sComm, for translating a text-based message from a first language to a second language, if necessary.

As a computer-implemented method for providing multilingual text-based conversations between two communicants, an exemplary embodiment of the invention performs the operations of displaying a message in a first communicant's language in one of the dialogue boxes; determining whether the first communicant's language needs to be translated; translating the message, if necessary, from the first communicant's language to the second communicant's language; and displaying the translated message in another of the dialogue boxes.

As a computer readable medium containing program instructions for providing multilingual text-based conversations between two communicants, an embodiment of the invention includes: computer readable code devices for enabling two communicants to engage in a conversation group; computer readable code devices providing a first message in a first communicant's language; computer readable code devices for translating the first message from the first communicant's language to a second communicant's language when the two communicant's languages is not the same; and computer readable code devices for displaying the messages on appropriate dialogue boxes.

These and other features and advantages of this invention are described in or are apparent from the following detailed description of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
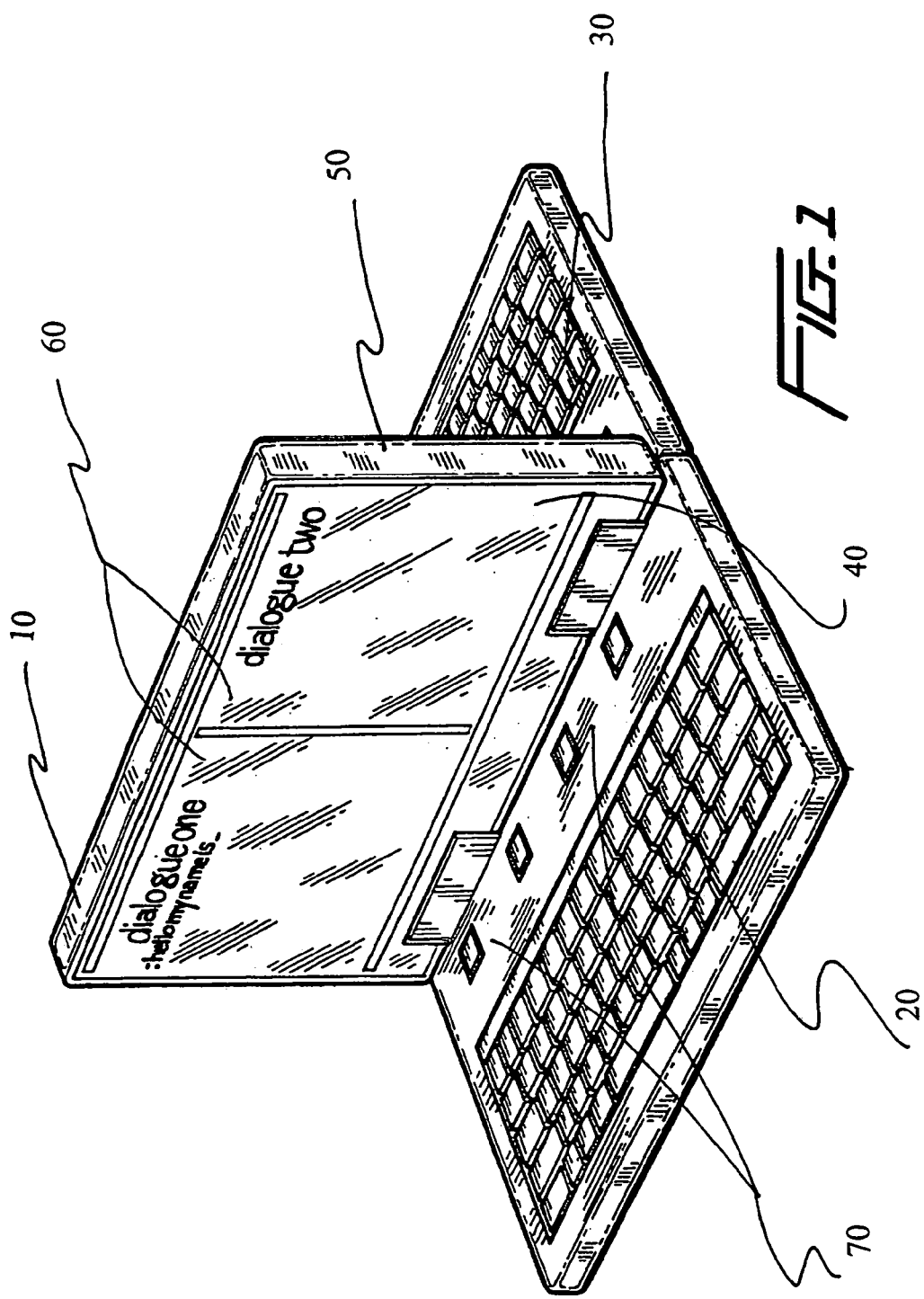
FIG. 1 illustrates an exemplary environmental perspective view of the sComm according to this invention.

For a general understanding of the features of the present invention, reference is made to the drawings, wherein like reference numerals have been used throughout to identify identical or similar elements. While the present invention will be described in terms of an illustrative embodiment or embodiments, it will be understood that he invention is adaptable to a variety of translation applications, such that the present invention is not necessarily limited to the particular embodiment or embodiments shown and described herein. To the contrary, the following description is intended to cover all alternatives, modifications, and equivalents, as may be included within the spirit and scope of the invention. Specially, it will be understood that the instant invention applies to all various types of translation applications and is not intended to be limited by the manner in which the conversations are relayed and/or translated.

As for the principles, the specific operation of the sComm system relates to a portable language communicator having language translation techniques for text-based conversations. The data forming the text-based conversation is relayed to a second communicant as typed or is translated from a user language to a second language and relayed to a second communicant. The result is that both communicants can seamlessly converse in a text-based conversation even if one or both of the communicants are hearing impaired, speech impaired or language impaired. The invention is particularly advantageous for those dealing with language barriers in communicating with those who can not hear or who can not understand the spoken language.

A language impaired user can carry around the portable sComm system allowing him or her to converse with another without the need of a human translator as though he or she was fluent in the conversation language. In addition, the language translation is performed in essentially real-time, allowing seamless interaction with one another.

FIG. 1 is an exemplary embodiment of the full view of the sComm system 10. The sComm system 10 comprises first 10 and second 30 keyboards, first 40 and second 50 (not visible) screen portions which comprise one or more dialog boxes 60 and one or more shortcut keys, sign language characters, language selection buttons and a foreign language symbols 70. In operation, a first user (not shown) selects a language. Next, the first user, via a first keyboard 20 types in a text based message. Then, the message is translated, if needed, and displayed on the second screen portion 50 in dialog box 60. The second user can then respond to the first user by typing, using the second keyboard 30, a message to the first user. This message is translated, if necessary, and forwarded and displayed on the first screen portion 40 via dialog box 60. An advantage of the sComm system is shown in its size and portability. In a preferred embodiment, the following dimensions can be realized: the screen portion can be 4 inches tall and the keyboard 4 inches deep with a 5 inch height and a 8 inch width. Each dialogue screen can be at least 4 inches wide. From the edge of one keyboard to the edge of the second keyboard, the total open width can be 8 inches. However, these dimensions are only illustrative and similar dimensions which emphasize portability and comfort can be utilized.

Figure 2:
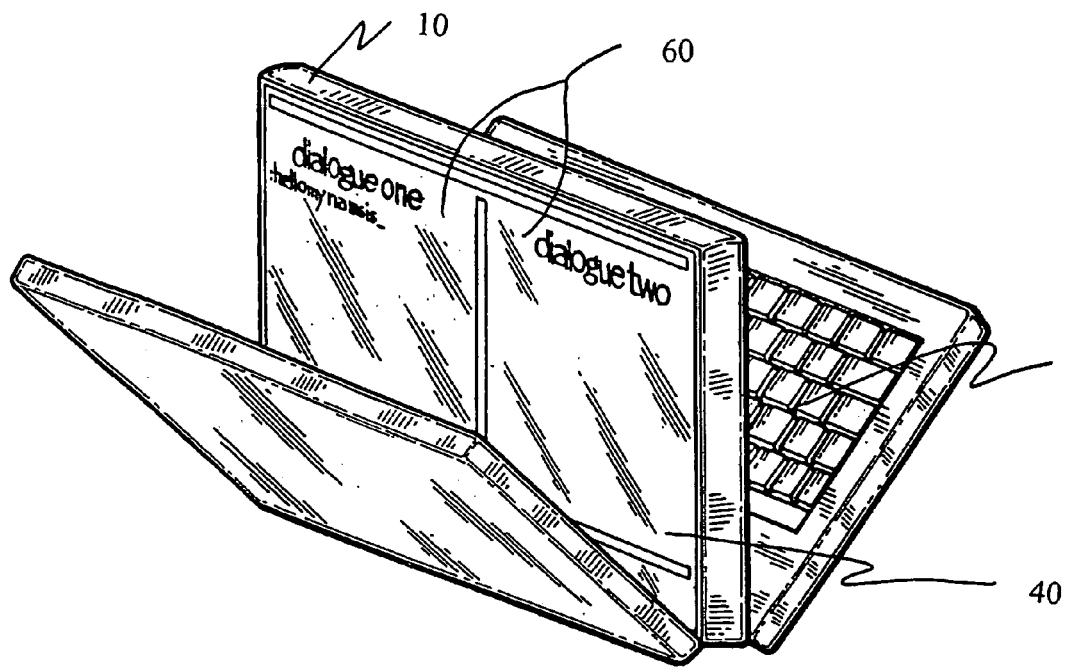
FIG. 2 illustrates a second exemplary environmental perspective view of the sComm according to this invention.

FIG. 2 illustrates an exemplary embodiment of the sComm system 10 opening. This figure illustrates the flexibility and compactness of the sComm system. The sComm system is easily stored and carried. A handle assembly (not shown) can also be combined with this configuration.

Figure 3:
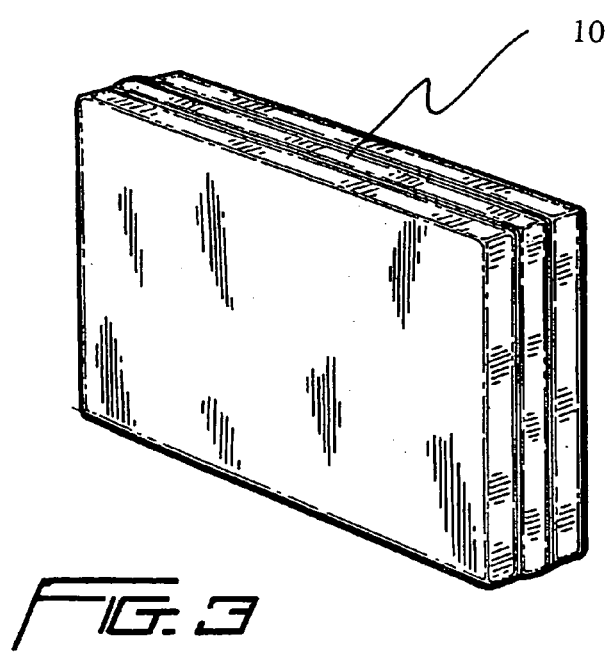
FIG. 3 illustrates a third exemplary environmental perspective view of the sComm according this invention.

FIG. 3 illustrates an exemplary embodiment of the sComm 10 system in the closed configuration. As shown in FIG. 3, the sComm system 10 is capable of folding into a compact configuration resembling a closed laptop. The compactness of the self-contained sComm 10 system allows for easy storage within a briefcase, backpack, medium size purse, etc.

Figure 4:
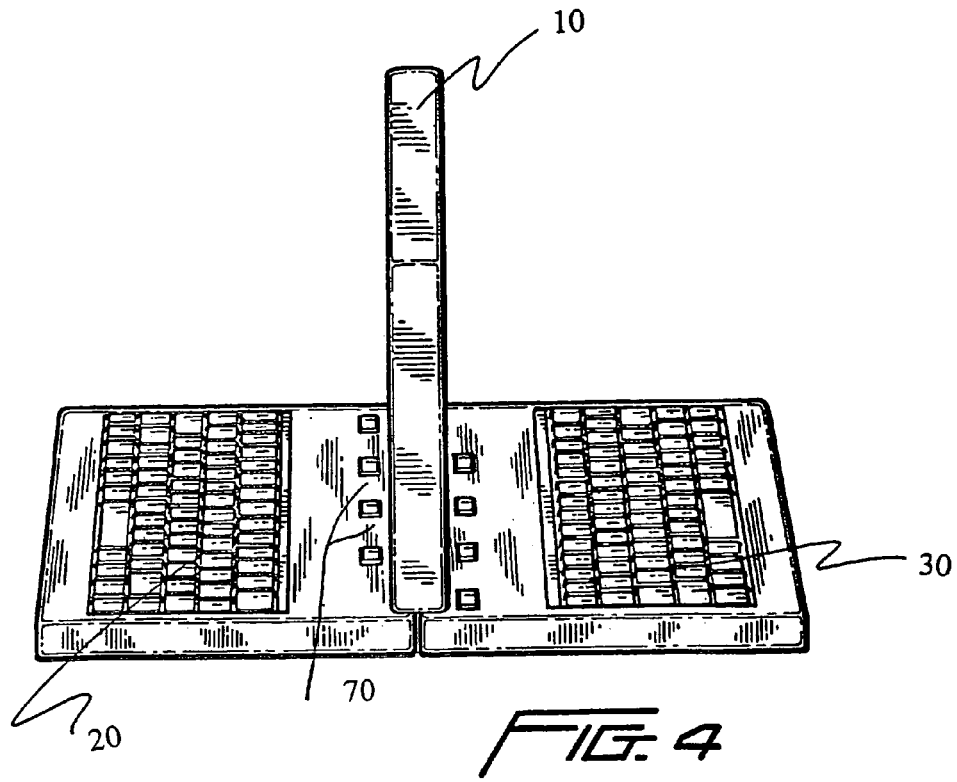
FIG. 4 illustrates a fourth exemplary environmental perspective view of the sComm according to this invention.

FIG. 4 illustrates an exemplary embodiment of a side view of the sComm system 10. Looking at this perspective, the two individual keyboards 20 and 30 can be seen. The keyboards utilized in the sComm system 10 can be of a standard configuration or can be custom keyboards (not shown). The custom keyboards can comprise special characters 70 such as sign language characters, Japanese characters and shortcut characters representing, for example, commonly used expressions.

Figure 5:
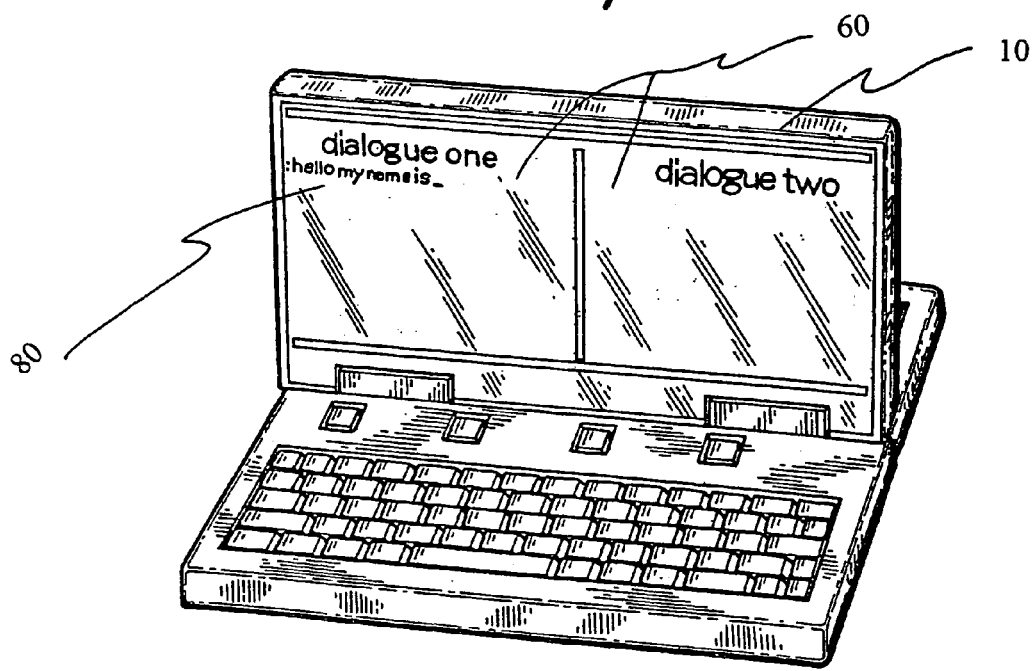
FIG. 5 illustrates an exemplary environmental view of one side of the sComm which is viewed by one communicant seeing both conversations simultaneously in accordance with the systems and methods of the invention.

FIG. 5 illustrates an exemplary embodiment of one perspective of the sComm system 10 which is viewed by one communicant seeing both conversations simultaneously in dialog boxes 60. Each communicant is able to view both dialogue boxes 60 and see the messages 80 as they are typed by each user. However, one communicant's perspective may relay the messages in English while the other communicant's perspective may relay the same message in another language, such as Spanish. This allows both communicants to have a conversation even if they speak different languages.

Each communicant will select a language before initiating the dialogue. English can be the default language unless otherwise noted. The dialogue boxes 10 can be configured in a side by side configuration, a top and bottom configuration, or alternating user configuration. As an exemplary example, the side by side dual screen configuration is shown in FIG. 5. Any screen configuration which serves to enhance the dialogue between the two communicants is within the scope of this invention. However, by having the screens in a back to back configuration, whereas each communicant can only see his or her side in his or her language, the communicants are able to oppose each other thereby allowing each of the communicant to view the expressions of the other as the dialogue is going on.

Figure 6:
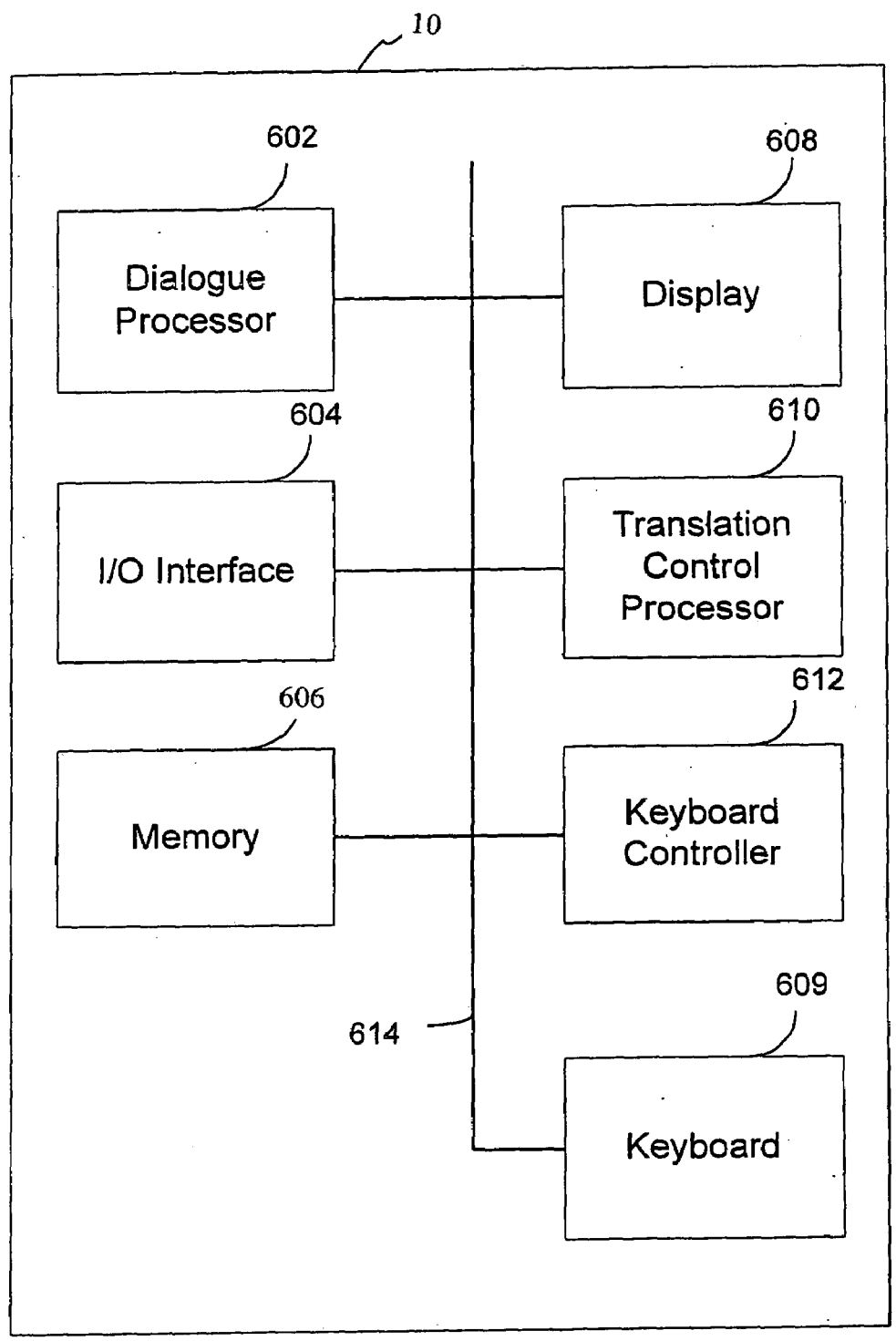
FIG. 6 is a block diagram illustrating an exemplary interactive sComm device in accordance with the systems and methods of the invention.

FIG. 6 illustrates an exemplary interactive conversational sComm device 10 in accordance with the systems and methods of the invention. The sComm device 10 includes a dialogue processor 602, an I/O interface 604, a memory 606, a display 608, a keyboard 609, a translation control processor 610, and a keyboard controller 612. While FIG. 6 shows the dialogue processor 602, the translation control processor 610, and the keyboard controller 612 as separate units, the functions performed by these units may be combined or may be further divided among specified processors such as digital signal processors and/or performed by dedicated hardware such as application specific integrated circuits (ASIC) or other hardware implementations integrated into existing translators, for example. The above components are coupled together through a control/signal bus 614. While FIG. 6 shows a bus architecture, other hardware configurations may also be possible as is well known in the art.

In an example of utilizing the invention, a text-based conversation initiated between an English-speaking user and a French-speaking user can be accomplished by the English-speaking user typing in the English message, and the message would be translated from English to French and then sent to the opposing display of the French-speaking user in French. When the French-speaking user types in and sends a message, the French message would be received by the opposing display translated and displayed in English. Various combinations of language translation can be utilized by this invention.

The processors used in the sComm system 10 need not be a single contiguous entity. In stead, the processors 602, 610 and 612 can be implemented, at least in part, as a plurality of general purpose data processors andlor a single special purpose integrated circuit (e.g., ASIC) or an array of ASICs each having a main or central processor section for overall system-level control, and separate sections dedicated to performing various specific computations, functions and other processes under the control of the central processor section. According to the invention, a particular function of the processor 610 is to perform real-time or near real-time language translation for text-based conversations. A speech synthesizer (not shown) can also be incorporated into the present invention giving the communicants who can not speak an artificial voice.

The keyboard 609 is used by a user to at least input commands and other instructions to the sComm system 10. The keyboard controller 612 is used at least to detect and recognize input commands, including special character keys, from the keyboard and relay this information to the dialogue processor 602. The dialogue processor 602 operates to at least process incoming and outgoing textual messages in accordance with the invention so that real-time multilingual conversations can be implemented.

Figure 7:
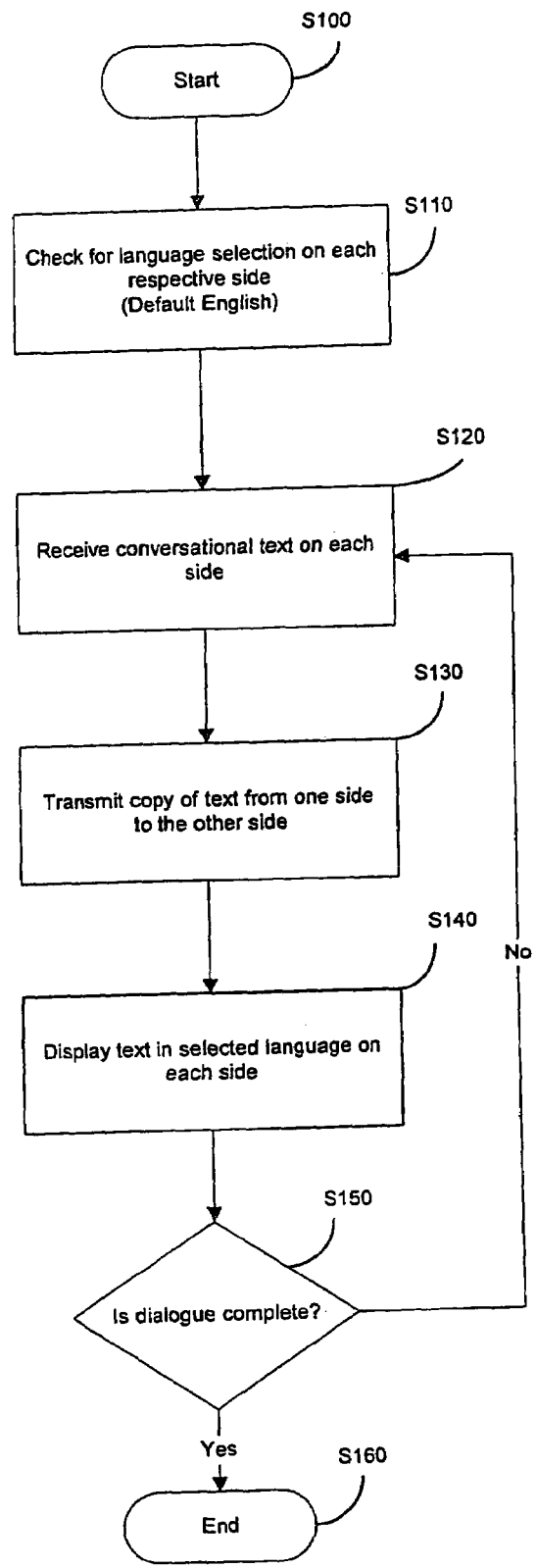
FIG. 7 is a flowchart illustrating an exemplary embodiment of a method for two-way conversation without an human translator in accordance with the systems and methods of the invention.

FIG. 7 illustrates an exemplary embodiment of a flow-chart of a method for two-way conversation without a human translator in accordance with the systems and methods of the invention. As shown in FIG. 7, the process begins in step S100, and continues to step S110, where language selection is detected on each communicants' side. If no language selection is detected before the input of text-data, the process defaults to the English language.

In step S120 the process receives the text-based data from at least one communicant. Then the process proceeds to step S130 where the text-based data is transmitted to the opposing side in the selected language. Then in step S140, the text-based data is displayed in the selected language. In step S150, the process checks for more data. If text data is detected the process jumps to step S120, otherwise the process proceeds to step S160. In step S160 the process ends.

The disclosed method may be readily implemented in software using object or object-oriented software development enviroments that provide portable source code that can be used on a variety of computer hardware platforms. Alternatively, the disclosed sComm operations may be implemented partially or fully in a hardware using standard logic circuits or VLSI designs. Whether software of hardware is used to implement the systems in accordance with this invention is dependent on the sppeed an/or efficiency requirements of the system, the particular function, and the particular software or hardware systems or microprocessors or microcomputer systems being utilized.

The invention has been described with particularity in connection with the embodiments. However, it should be appreciated that many alternates, modifications and variations may be made to the embodiments of the invention without departing from the spirit and inventive concepts contained herein. Accordingly, the present invention is intended to embrace all such alternatives, modifications, and variations.

What is claimed is:

1. A method for providing multilingual text-based dialogue between two opposing communicants facing each other in a self-contained portable environment, the method comprising:

selecting a dialogue language for each of the two opposing communicants using input devices positioned opposed to one another;

receiving text-based data based on the dialogue language from at least one of the two communicants;

transmitting the text-based data to an opposing display in the opposing communicant's selected language; and displaying the text-based data in the selected languages;

wherein the self-contained portable environment is characterized by a compact folding laptop-like configuration with at least one display for each of the two opposing communicants, said displays being erected upright when in use, and said self-contained portable environment being foldable into a compact configuration whereby said displays are disposed between said opposing input devices.

2. The method of claim 1, wherein the displaying the text-based data step includes displaying the text in dialogue boxes arranged in side-by-side or top-bottom configuration.

3. The method of claim 1, wherein the selecting a dialogue language step includes selecting of at least one of English, Spanish, French, German and Chinese.

4. A system for multilingual text-based dialogue between two opposing communicants facing each other in a self-contained portable environment, the system comprising:

an I/O interface for selecting a dialogue language for each of the two opposing communicants, said I/O interface including input devices positioned opposed to one another, and connected so as to allow two communicants to face one another and input text-based data;

a dialogue processor for receiving the inputted text-based data based on the dialogue language from at least one of the two communicants;

a first display screen for displaying text-based data entered by at least one of the two communicants;

a translation control processor for translating the text-based data to the opposing communicant's selected language for display to the opposing communicant; and a second display screen for displaying the text-based data to the other communicant in the selected language selected by the other communicant;

wherein said first and second display screens are erected substantially upright when said system is in operation, and wherein said system is foldable into a compact configuration wherein said first and second display screens are disposed between said opposing input devices.

5. The system of claim 4, wherein the display displays the text in dialogue boxes arranged in side-by-side or top-bottom configurations.

6. The system of claim 4, wherein the I/O interface can be used to select at least one of English, Spanish, French, German and Chinese.

* * * * *